(12) United States Patent
Ishiguro et al.

(10) Patent No.: US 11,525,287 B2
(45) Date of Patent: Dec. 13, 2022

(54) VEHICLE DOOR LATCH APPARATUS

(71) Applicant: MITSUI KINZOKU ACT CORPORATION, Yokohama (JP)

(72) Inventors: Katsuyuki Ishiguro, Yokohama (JP); Hirotaka Nishijima, Yokohama (JP); Shunsuke Tamura, Yokohama (JP); Shintaro Okawa, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 140 days.

(21) Appl. No.: 17/046,059

(22) PCT Filed: Aug. 7, 2018

(86) PCT No.: PCT/JP2018/029542
§ 371 (c)(1),
(2) Date: Oct. 8, 2020

(87) PCT Pub. No.: WO2019/202750
PCT Pub. Date: Oct. 24, 2019

(65) Prior Publication Data
US 2021/0032911 A1    Feb. 4, 2021

(30) Foreign Application Priority Data
Apr. 18, 2018  (JP) .............................. JP2018-080279

(51) Int. Cl.
*E05B 79/22*    (2014.01)
*E05B 77/30*    (2014.01)
(Continued)

(52) U.S. Cl.
CPC .............. *E05B 79/22* (2013.01); *E05B 77/30* (2013.01); *E05B 81/04* (2013.01); *E05B 81/16* (2013.01);
(Continued)

(58) Field of Classification Search
CPC .......... E05B 79/22; E05B 81/00; E05B 81/02; E05B 81/04; E05B 81/06; E05B 81/12;
(Continued)

(56) References Cited

U.S. PATENT DOCUMENTS

| 2006/0103143 A1* | 5/2006 | Belmond ................ E05B 81/06 292/201 |
| 2009/0199605 A1 | 8/2009 | Spurr et al. |
| 2015/0097379 A1 | 4/2015 | Spurr et al. |

FOREIGN PATENT DOCUMENTS

| DE | 4433994 C1 * | 3/1996 | ............. E05B 77/28 |
| DE | 10 2007 045 228 A1 | 2/2008 | |

(Continued)

OTHER PUBLICATIONS

Numbered paragraphs version of GB2433768A (Year: 2007).*
(Continued)

*Primary Examiner* — Christine M Mills
*Assistant Examiner* — Christopher F Callahan
(74) *Attorney, Agent, or Firm* — Foley & Lardner LLP

(57) ABSTRACT

Lock mechanism is provided between pawl lever and manual release mean. The present vehicle door latch apparatus includes ratchet member that engages latch and that can be released from latch by release component force F2, latch restraint that prevents ratchet member from being disengaged from latch and powered release means that moves ratchet restraint. Ratchet member includes base lever and pawl lever. When ratchet restraint is moved, base lever is moved to a non-regulated position, where pawl lever can be disengaged from latch by release component force F2. Manual release means is connected to pawl lever. Lock mechanism is provided between pawl lever and manual release means.

6 Claims, 10 Drawing Sheets

(51) Int. Cl.
*E05B 81/04* (2014.01)
*E05B 81/16* (2014.01)
*E05B 81/42* (2014.01)
*E05B 81/82* (2014.01)
*E05B 83/36* (2014.01)
*E05B 85/26* (2014.01)
*E05B 85/24* (2014.01)

(52) U.S. Cl.
CPC .............. *E05B 81/42* (2013.01); *E05B 81/82* (2013.01); *E05B 83/36* (2013.01); *E05B 85/26* (2013.01); *E05B 85/243* (2013.01); *E05Y 2201/434* (2013.01); *E05Y 2201/638* (2013.01); *E05Y 2400/612* (2013.01); *E05Y 2900/531* (2013.01)

(58) Field of Classification Search
CPC .......... E05B 81/14; E05B 81/16; E05B 81/24; E05B 81/26; E05B 81/30; E05B 81/32; E05B 81/42; E05B 81/80; E05B 81/82; E05B 85/20; E05B 85/24; E05B 85/243; E05B 85/26; Y10T 292/1047; Y10T 292/1082; Y10S 292/23
See application file for complete search history.

(56) References Cited

FOREIGN PATENT DOCUMENTS

| | | | |
|---|---|---|---|
| EP | 1503012 A1 * | 2/2005 | ............ E05B 81/14 |
| GB | 2 433 768 A | 7/2007 | |
| JP | 2000-064685 A | 2/2000 | |
| JP | 2002-295095 A | 10/2002 | |
| JP | 2004-169392 A | 6/2004 | |
| JP | 2015-074976 A | 4/2015 | |
| JP | 2015-145594 A | 8/2015 | |
| WO | WO-2013102838 A1 * | 7/2013 | ............ E05B 81/06 |

OTHER PUBLICATIONS

International Searching Authority, "International Search Report," issued in connection with International Patent Application No. PCT/JP2018/029542, dated Sep. 11, 2018.

International Searching Authority, "Written Opinion," issued in connection with International Patent Application No. PCT/JP2018/029542, dated Sep. 11, 2018.

\* cited by examiner

VEHICLE DOOR LATCH APPARATUS

TECHNICAL FIELD

This present application claims priority under 37 U.S.C. § 371 to International Patent Application No. PCT/JP2018/029542, filed on Aug. 7, 2018, which claims priority to and the benefit of Japanese Patent Application No. 2018-080279, filed on Apr. 18, 2018. The contents of these applications are hereby incorporated by reference in their entireties.

The present invention relates to a vehicle door latch apparatus, particularly to a vehicle door latch apparatus having powered release means and manual release means.

BACKGROUND OF THE INVENTION

A conventional vehicle door latch apparatus is unlatched by powered release means or manual release means so that the door can be opened. Powered release means is constituted by a motor and so on, and manual release means is constituted by a door opening handle or a door key cylinder and so on (JP 2002-295095).

From the viewpoint of security, a lock mechanism that disables or inactivates the manual release means is provided.

DE102007045228A1 discloses a vehicle door latch apparatus that can reduce the release operation force of the release means. This apparatus is equipped with a ratchet restraint that moves between a blocked position where a ratchet is prevented from being disengaged from a latch and a release position where the ratchet is allowed to be disengaged from the latch. The release operation force is transmitted to the ratchet restraint, not to the ratchet. The ratchet restraint is moved from the blocked position to the release position by the release operation force.

SUMMARY OF THE INVENTION

The powered release means and the manual release means can be operated independent of each other, but combining them with the lock mechanism requires a troublesome and complicated design. One of the reasons is that both the release operation force of the powered release means and the release operation force of the manual release means are transmitted to the same member. In the apparatus that is described in JP 2002-295095, the release operation force is transmitted to the ratchet that engages the latch. In the apparatus that is described in DE102007045228A1, the release operation force is transmitted to the ratchet restraint that blocks the ratchet.

In order to transmit the release operation forces to a common member, it is necessary to prevent the powered release means and the manual release means from interfering with each other. Since the release operation forces are transmitted to the same member, when the door is opened by the powered release means, it is necessary to return the lock mechanism to the unlocked position at the same time in order to remove the mismatch in the operating system.

Accordingly, the present invention is directed to a vehicle door latch apparatus comprising: a latch that can be rotated against latch return force from an unlatched position to an over-rotating position through a full-latched position while the latch engages a strike; a ratchet member that is rotatably supported by a ratchet shaft, wherein the ratchet member having a pawl portion that can be moved to a latch engaging position, where the pawl portion can face the full-latch engaging portion of the latch, and to a latch disengaging position, where the pawl portion is disengaged from the full-latch engaging portion, wherein the ratchet can be released from the latch by release component force, the release component force being caused by latch return force that the ratchet receives via the latch; a latch restraint that can be moved to a blocked position, where the latch restraint prevents the ratchet member from being disengaged from the latch, and a release position, where the latch restraint allows the ratchet member to be disengaged from the latch; and a powered release means that moves the ratchet restraint. The ratchet member includes a base lever that is rotatably supported by the ratchet shaft and a pawl lever that is rotatably supported by the base lever via a connecting shaft and that has the pawl portion. The base lever is moved from a regulated position to a non-regulated position when the ratchet restraint is moved from the blocked position to the release position, and the pawl lever can be disengaged from the latch by the release component force. The pawl lever can be moved about the connecting shaft in a latch releasing direction independent of the base lever that is at the regulated position. Manual release means is connected to the pawl lever and can move the pawl lever in the latch releasing direction. A lock mechanism is provided between the pawl lever and the manual release means, wherein the lock mechanism is switched between a locked state where the manual release means is disabled or inactivated and an unlocked state where the manual release means can be activated.

According to the invention of claims 1 and 2, since the powered release means and the manual release means operate different members in order to open the door, the powered release means and the manual release means can be provided without interfering with each other. In addition, the lock mechanism for the manual release means can be provided without affecting the powered release means.

According to the invention of claim 3, since the lock mechanisms are provided individually for the outer door opening handle and the inner door opening handle, the arrangement of the lock mechanisms can be simplified.

According to the invention of claim 4, since the lock mechanism is provided near the door opening handle, the latch unit can be simplified. In addition, the door opening handle and the lock mechanism can be unitized. In that case, these parts can be easily mounted to the door.

According to the invention of claim 5, since the lock mechanism is not affected by the operation of the powered release mechanism, the arrangement can be simplified. In addition, since the state of the lock mechanism is not changed by the operation of the powered release mechanism, the lock mechanism can be continuously used in the locked condition.

According to the invention of claim 6, since the lock mechanism can be manually switched to the unlocked state, when the powered release mechanism does not work, the manual release mechanism can be used as a fail-safe mechanism for the powered release mechanism.

According to the invention of claim 7, the powered release means can be operated even when the supply voltage for the operation of the engine is insufficient.

Further, according to the invention of claims 8 to 10, since the powered release means and the manual release means operate different members in order to open the door, the powered release means and the manual release means can be provided without interfering with each other.

The above and other objects, features and advantages of the present invention will become apparent from the following description with reference to the accompanying drawings which illustrate examples of the present invention.

EXPLANATION OF REFERENCE NUMERALS

10 . . . vehicle door latch apparatus, 10A . . . latch unit, 10B . . . outer door opening handle, 10C . . . inner door opening handle, 11 . . . latch body, 11a . . . striker passage, 12 . . . latch shaft, 13 . . . latch, 13a . . . outer peripheral edge, 13b . . . striker engaging groove, 13c . . . half-latch engaging portion, 13d . . . full-latch engaging portion, 13e . . . connecting slope, 14 . . . latch spring, 15 . . . ratchet member, 15a . . . pawl portion, 15b . . . connecting shaft, 16 . . . ratchet shaft, 17 . . . ratchet spring, 17a . . . coil portion, 17b . . . spring leg, 17c . . . spring leg, 18 . . . striker, 19 . . . base lever, 19a . . . metal plate, 19b . . . resin cover, 19c . . . shaft hole, 19d . . . bifurcating portion, 19e . . . outer wall, 19f . . . abutting arm, 19g . . . abutting surface, 19h . . . arm portion, 20 . . . pawl lever, 20a . . . metal plate, 20b . . . resin cover, 20c . . . ratchet pin, 21 . . . gap, 22 . . . ratchet restraint, 22a . . . blocking surface, 22b . . . releasing surface, 22c . . . return cam surface, 23 . . . support shaft, 24 . . . powered release means, 25 . . . motor, 26 . . . cylindrical worm, 27 . . . worm wheel, 27a . . . peripheral gear, 28 . . . wheel shaft, 29 . . . connecting pin, 30 . . . ECU, 31 . . . limit switch, 32 . . . manual release means, 33 . . . opening lever, 34 . . . outer lock mechanism, 35 . . . inner lock mechanism, 36 . . . child proof mechanism, 37 . . . switching portion, 38 . . . door opening switch, 39 . . . battery, 40 . . . rib, 41 . . . rib switch, 42 . . . timer, 43 . . . latch switch, 44 . . . striker switch . . . F1 . . . main component, . . . F2 . . . release component, . . . P1 . . . external force, . . . P2 . . . external force

DETAILED DESCRIPTION OF THE INVENTION

An embodiment of the present invention will be described with reference to the drawings. As shown in the schematic view of FIG. 14, vehicle door latch apparatus 10 according to an embodiment of the present invention has latch unit 10A that is fixed to a door, outer door opening handle 10B that is connected to latch unit 10A and inner door opening handle 10C that is connected to latch unit 10A.

Figure 1:
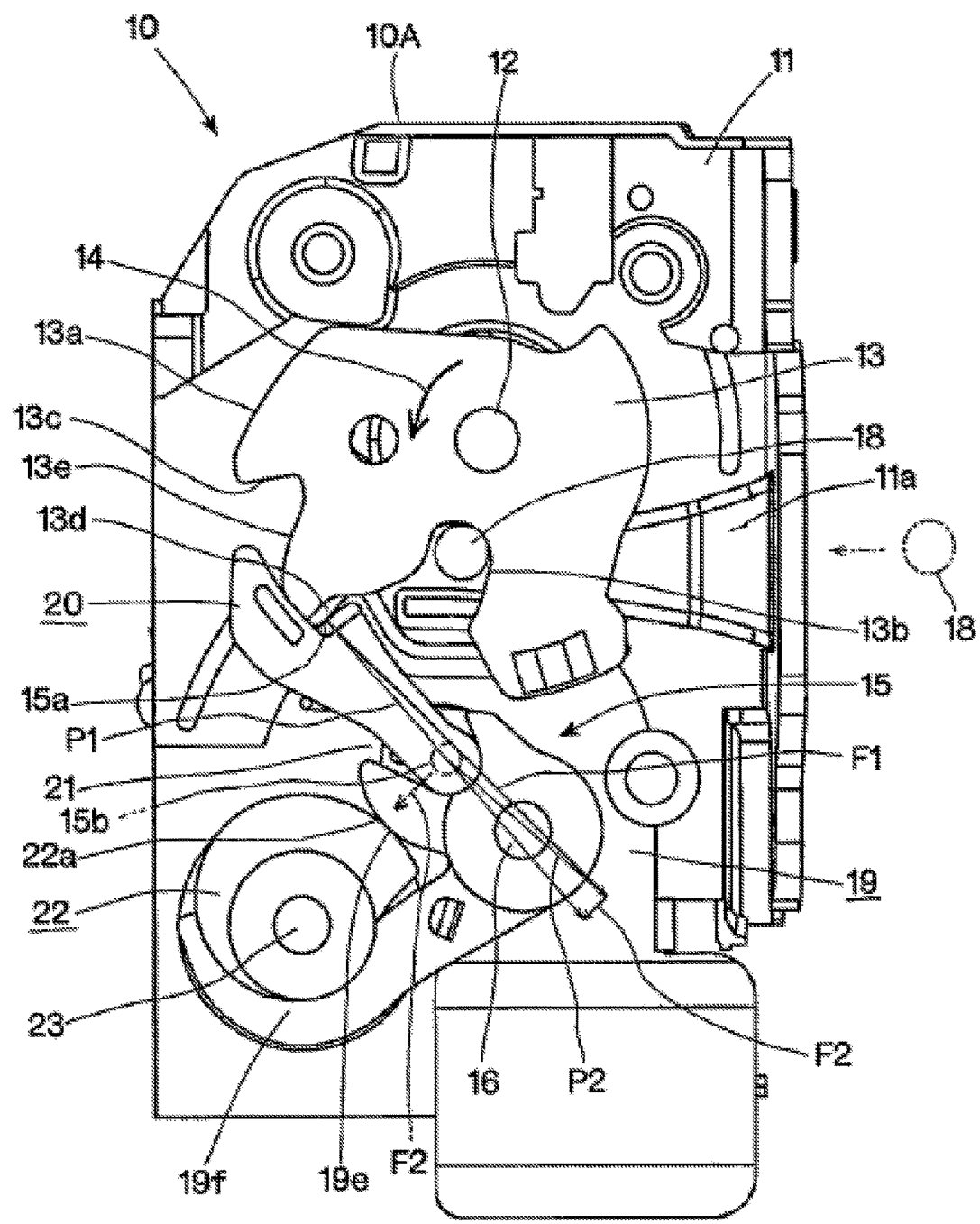
FIG. 1 is a front view of the latch unit of the vehicle door latch apparatus in the full-latched state (the door opened state) according to an embodiment of the present invention.

FIG. 1 shows a front view of latch unit 10A in the door closed state. Latch 13 that can engage striker 18 of a vehicle is rotatably supported by latch body 11 of latch unit 10A via latch shaft 12. Latch 13 is biased in the door opening direction (the releasing direction or the counterclockwise direction) by means of latch spring 14 (indicated by the arrow that shows the elastic force).

Figure 11:
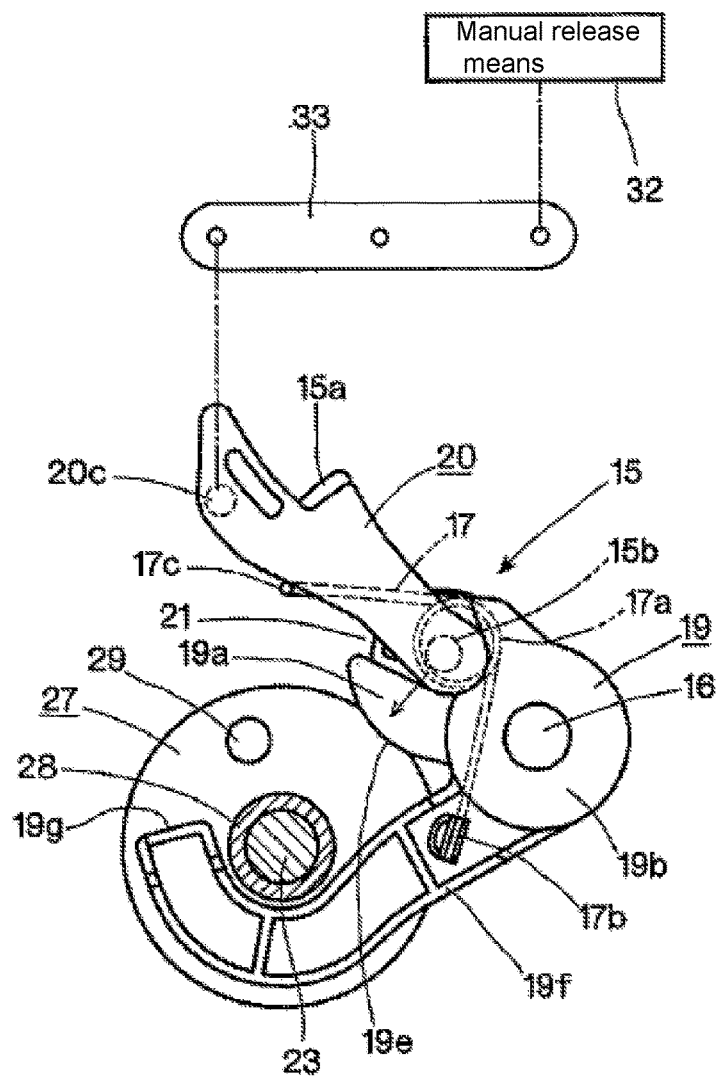
FIG. 11 is a partial front longitudinal view showing the ratchet member, the worm wheel and the manual release means that is operatively connected to the ratchet member.

At the bottom of latch body 11, ratchet member 15 that can engage latch 13 is rotatably supported by ratchet shaft 16. Ratchet member 15 is biased in the latch engaging direction by ratchet spring 17 (FIG. 11). Pawl portion 15a of ratchet member 15 is in contact with outer circumference 13a of latch 13 due to the elastic force of ratchet spring 17 in the unlatched state (FIG. 3A, FIG. 4D).

When the vehicle door is moved in the door closing direction, striker 18 that is fixed to the body (not illustrated) moves relative to and into horizontally extending striker passage 11a that is formed in latch body 11. Then, striker 18 abuts against U-shaped striker engaging groove 13b of latch 13, so as rotate latch 13 in the door closing direction (the full-latching direction or the clockwise direction) against the elastic force of latch spring 14. Like a typical well-known latch, latch 13 has half-latch engaging portion 13c and full-latch engaging portion 13d along the outer circumference thereof.

Figure 3A:
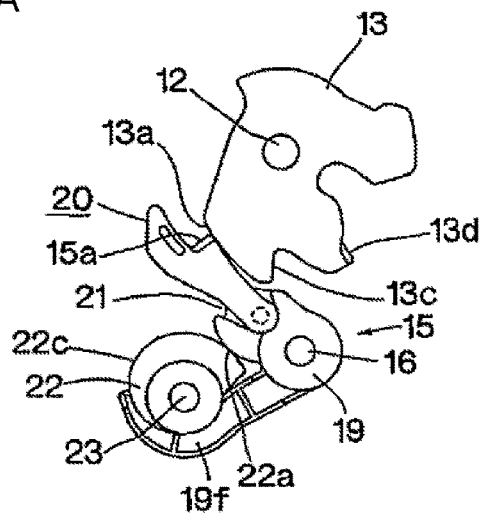
FIG. 3A is a view showing the door closing operation (when the latch is in the unlatched position (the door opened position))
Figure 3B:
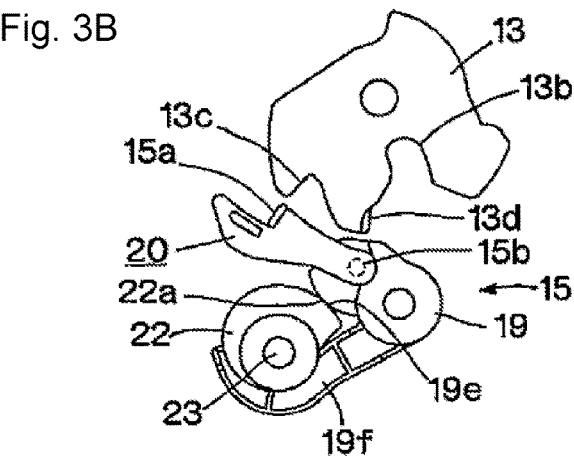
FIG. 3B is a view showing the door closing operation (when the latch has been rotated to the half-latched position)
Figure 3C:
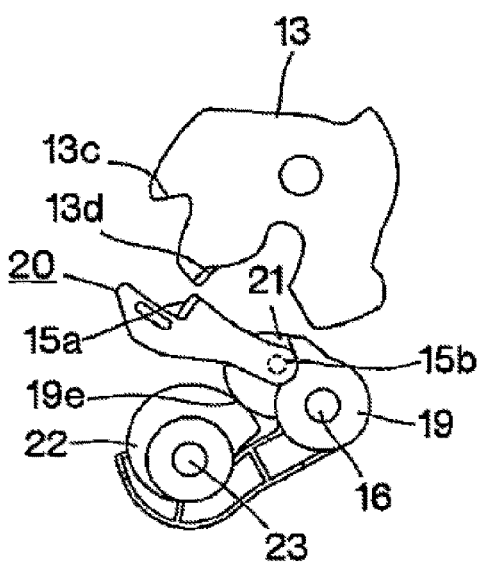
FIG. 3C is a view showing the door closing operation (when the latch has been rotated to the full-latched position)
Figure 3D:
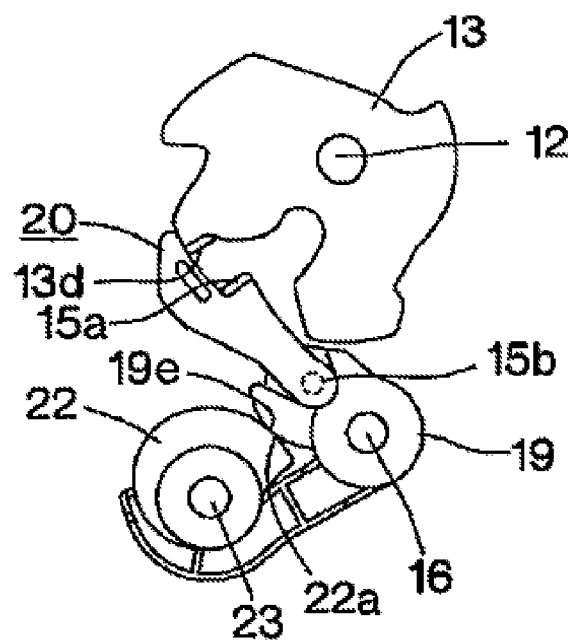
FIG. 3D is a view showing the door closing operation (when the latch has been rotated to the over rotating position)

Latch 13 typically rotates from the unlatched position shown in FIG. 3A to the over rotating position shown in FIG. 3D through the half-latched position (FIG. 3B) where pawl portion 15a can engage half-latch engaging portion 13c and through the full-latched position (FIG. 3C) where pawl portion 15a can engage full-latch engaging portion 13d. After rotating to the over rotating position, latch 13 is rotated back in the releasing direction (the counterclockwise direction) by the elastic force of latch spring 14 and the repulsive force of the sealing member (not shown) that is provided between the door and the vehicle body (hereinafter these are referred to as "latch return force").

Figure 3E:
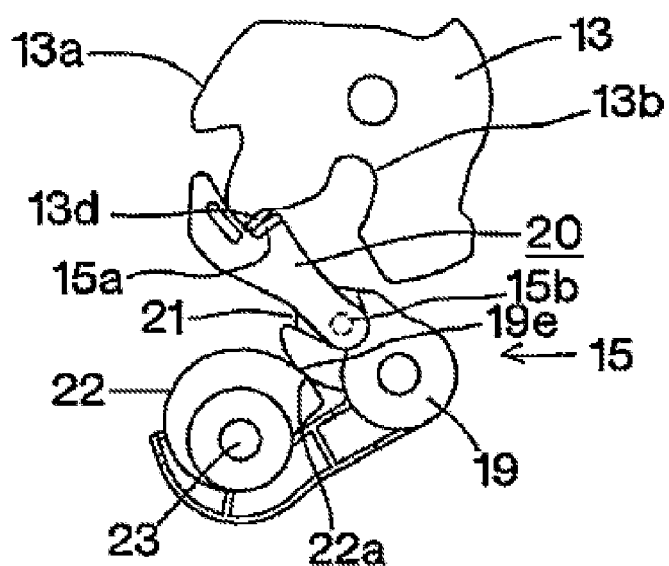
FIG. 3E is a view showing the door closing operation (when the latch has returned to the full-latched position and the door is closed)

On the other hand, pawl portion 15a of ratchet member 15 is moved from the latch release position to the latch engaging position by the elastic force of ratchet spring 17, then engages full-latch engaging portion 13d of latch 13 that is rotated back from the over rotating position to the full-latched position, so as to be in the full-latched state shown in the FIG. 3E, and the door closing operation is completed.

The latch return force that is transmitted from full-latch engaging portion 13d of latch 13 to pawl portion 15a of ratchet member 15 is set such that it is largely received by ratchet shaft 16 as main component force F1, as will be described later and such that a part of the force works as release component force F2 in the direction of pushing ratchet member 15 in the latch releasing direction (the direction opposite to the latch engaging direction).

(Ratchet Member 15)

Ratchet member 15 of the present embodiment consists of base lever 19 and pawl lever 20, as shown in FIGS. 5 to 8. Base lever 19 and pawl lever 20 are insert-molded and have metal plates 19a, 20a, which are main parts, and resin covers 19b, 20b for metal plates 19a, 20a, respectively. Resin cover 19b is omitted in FIGS. 3 and 4.

The base portion of base lever 19 is rotatably supported by ratchet shaft 16, and the base portion of pawl lever 20 is rotatably supported by the end of base lever 19 via connecting shaft 15b. In the present embodiment, connecting shaft 15b is formed integral with pawl lever 20, and is rotatably supported by shaft hole 19c (see FIG. 5) that is formed in resin cover 19b. Pawl portion 15a that latch 13 engages is formed at the end of metal plate 20a of pawl lever 20.

Bifurcating portion 19d is formed at the end of metal plate 19a of base lever 19. Bifurcating portion 19d consists of a pair of arm portions 19h of base lever 19, supports connecting shaft 15b and houses the base portion of pawl lever 20. Gap 21 (see FIG. 6) is formed between the base portion of pawl lever 20 and bifurcating portion 19d (a pair of arm portions 19h). Gap 21 allows pawl lever 20 to rotate alone about connecting shaft 15b relative to base lever 19 within a predetermined angle range.

Ratchet spring 17 is preferably a torsion coil spring, as shown in FIG. 11. Center coil portion 17a is disposed around the outer periphery of connecting shaft 15b, one spring leg portion 17b is in contact with base lever 19, and the other spring leg portion 17c is in contact with pawl lever 20. Due to this spring arrangement, the elastic force of ratchet spring 17 hardly acts on base lever 19 in the revolution direction, and biases pawl lever 20 alone in the latch engaging direction about connecting shaft 15b.

Connecting shaft 15b, via which pawl lever 20 is rotatably supported by base lever 19, is disposed at the middle position of ratchet member 15 in the longitudinal direction thereof. When release component force F2 is generated in ratchet member 15 in the latch releasing direction by the latch return force, release component force F2 acts exclusively on connecting shaft 15b that is located at the intermediate position. Ratchet member 15 is bent at the central portion by release component force F2 (see FIG. 4B) in order to disengage pawl portion 15a from full-latch engaging portion 13d. In other words, ratchet member 15 of the present invention is pushed from latch 13 by the latch return force and is disengaged from latch 13. Thus, unlike a conventional ratchet, ratchet member 15 of the present invention is characterized in that it cannot keep latch 13 at the full-latched position by itself against release component force F2.

(Ratchet Restraint 22)

Figure 4A:
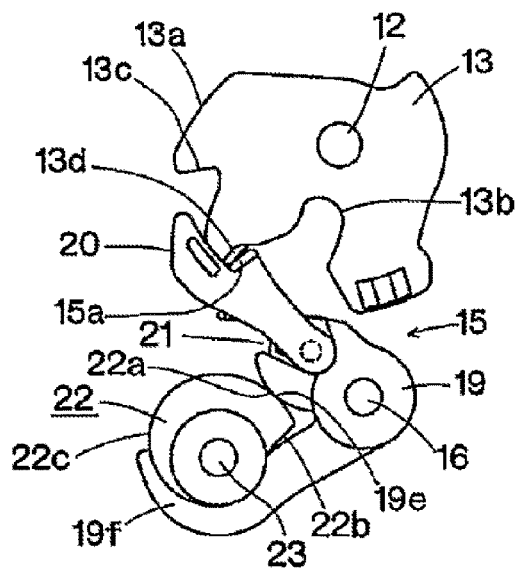
FIG. 4A is a view showing the door opening operation (in the full-latched state)
Figure 4B:
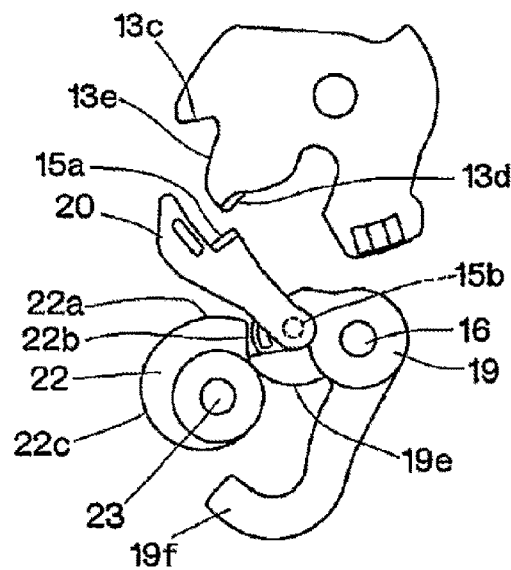
FIG. 4B is a view showing the door opening operation (when the ratchet restraint has been moved to the release position and the base lever is unblocked)
Figure 4C:
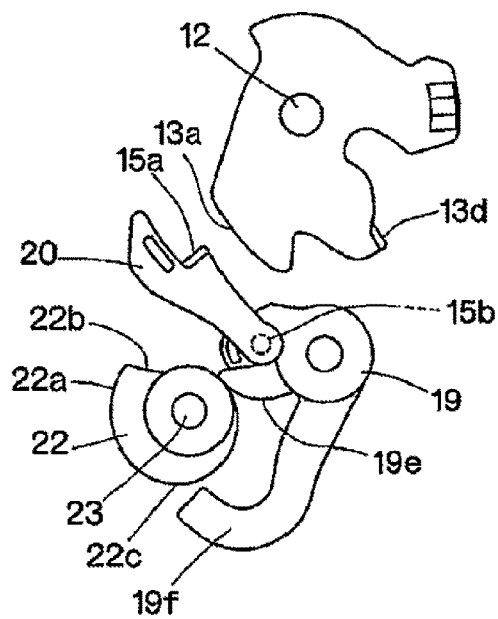
FIG. 4C is a view showing the door opening operation (when the latch has returned to the unlatched position)
Figure 4D:
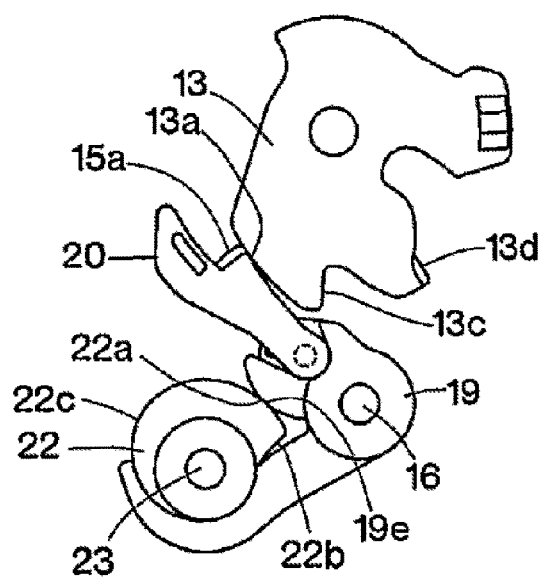
FIG. 4D is a view showing the door opening operation (when the ratchet restraint has been rotated 360 degrees back to the blocked position)
Figure 5:
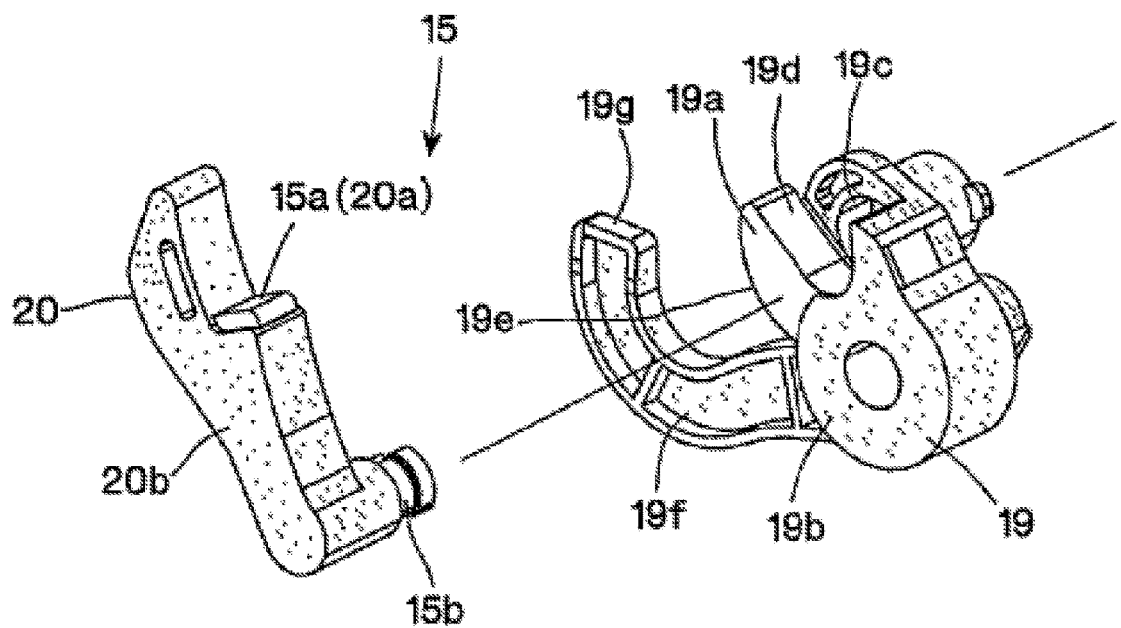
FIG. 5 is an exploded perspective view of the ratchet member.
Figure 6:
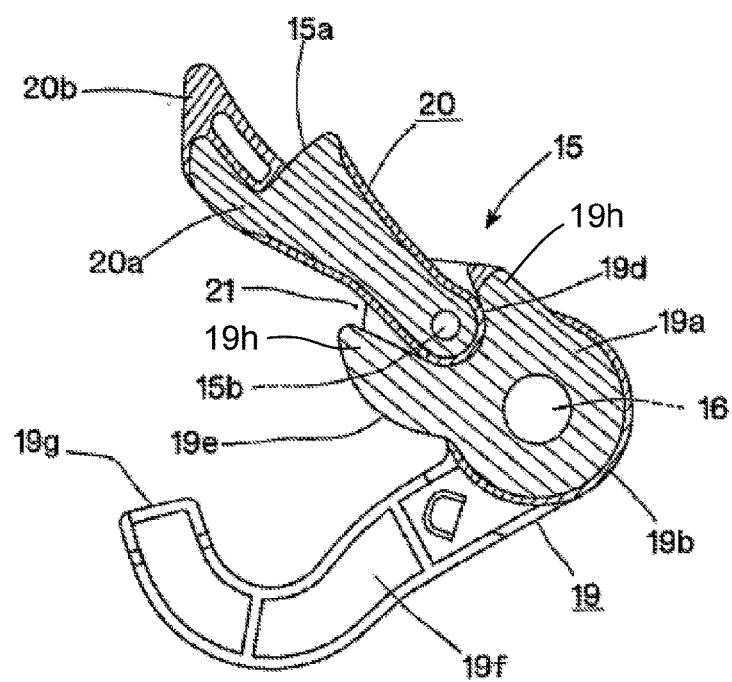
FIG. 6 is a longitudinal sectional view of the ratchet member.
Figure 7:
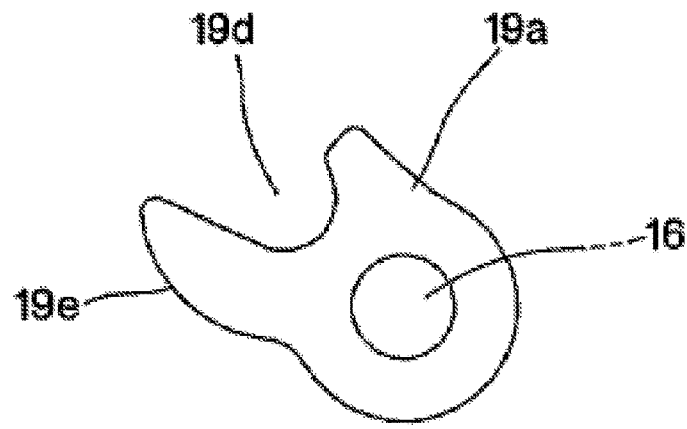
FIG. 7 is a front view of the metal plate of the base lever of the ratchet member.
Figure 8:
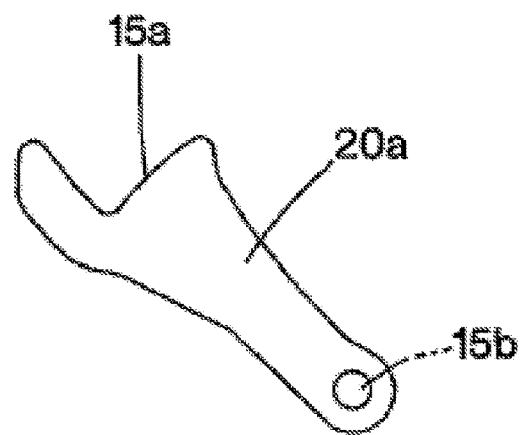
FIG. 8 is a front view of the metal plate of the pawl lever of the ratchet member.
Figure 9:
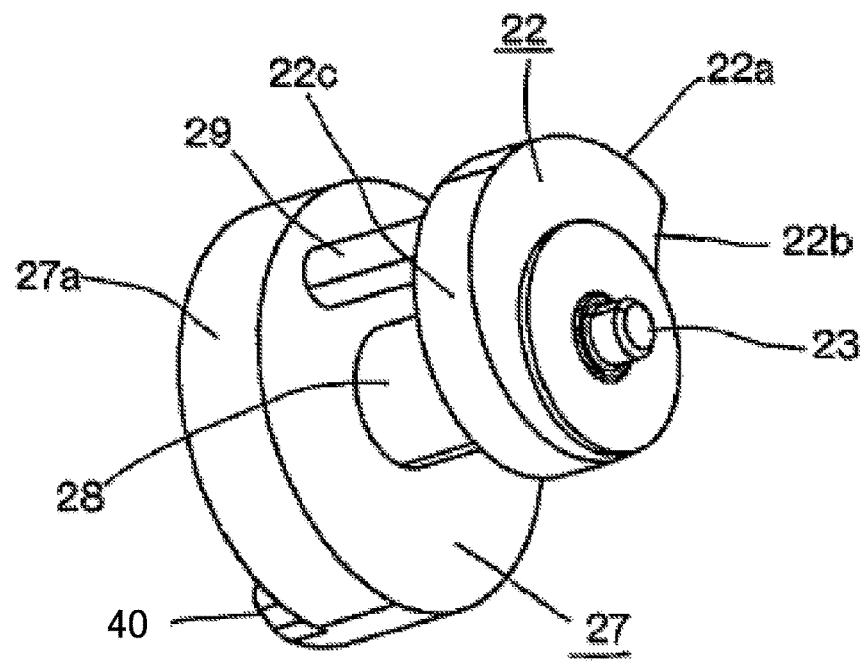
FIG. 9 is a perspective view of the ratchet restraint and the worm wheel.
Figure 10:
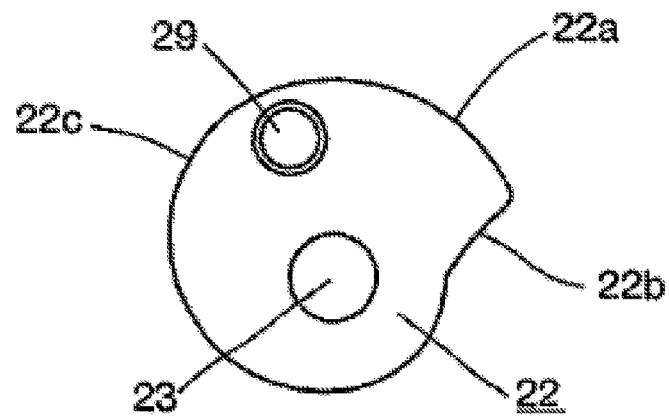
FIG. 10 is a front view of the ratchet restraint.

Ratchet restraint 22 that has an outer surface that abuts ratchet member 15 and that can prevent ratchet member 15 from moving in the latch releasing direction is arranged near the side of ratchet member 15. Ratchet restraint 22 is rotatably supported by support shaft 23 on the front side of latch body 11. Ratchet restraint 22 is rotated 360 degrees about support shaft 23 by the motor power of powered release means 24 so that ratchet restraint 22 is moved to the blocked position (FIG. 4A, FIG. 4D), to the release position (FIG. 4B) and to the abutting position (FIG. 4C). As shown in FIG. 10, ratchet restraint 22 has, on the outer surface thereof, blocking surface 22a, releasing surface 22b that is connected to blocking surface 22a, and return cam surface 22c that is connected both to releasing surface 22b and to blocking surface 22a on both sides thereof.

(Blocking Surface 22a)

Blocking surface 22a of ratchet restraint 22 has an arc shape whose center is on support shaft 23. When ratchet restraint 22 is in the blocked position, blocking surface 22a faces outer wall 19e of one of arm portions 19h of base lever 19.

In the blocking state where blocking surface 22a faces outer wall 19e, even if the latch return force is transmitted from latch 13 to ratchet member 15 and release component force F2 acts on connecting shaft 15b in the latch releasing direction, release component force F2 is securely supported by arc-shaped blocking surface 22a, and connecting shaft 15b (base lever 19) cannot be moved in the latch releasing direction. Therefore, in the blocking state, ratchet member 15 remains engaged with latch 13, and the door stays closed, as shown in FIG. 1 and FIG. 4A.

The blocked position of ratchet restraint 22 is also the initial or waiting position, and ratchet restraint 22 is usually kept at the blocked position. It should be noted that the position where outer wall 19e abuts against blocking surface 22a at the blocked position is the restricted position of base lever 19.

(Releasing Surface 22b)

Releasing surface 22b is formed to have a shorter diameter than blocking surface 22a. That is, releasing surface 22b is closer to the rotational center (support shaft 23) of ratchet restraint 22 than blocking surface 22a. When ratchet restraint 22 is rotated counterclockwise in FIG. 1 and FIG. 4A, releasing surface 22b faces outer wall 19e and releases base lever 19 that is blocked. Then, due to release component force F2, base lever 19 moves in the latch releasing direction from the restricted position to the non-restricted position. When base lever 19 is moved to the non-restricted position, pawl portion 15a is ejected from full-latch engaging portion 13d in the latch releasing direction, and as a result, latch 13 is disengaged from ratchet member 15 and the door can be opened.

The position where releasing surface 22b faces outer wall 19e is the position where ratchet restraint 22 is released. Further, the restricted position of base lever 19 is the position where outer wall 19e abuts against blocking surface 22a that is at the blocked position, and the non-restricted position of base lever 19 is the position where base lever 19 is moved in the latch releasing direction by release component force F2, so as to allow latch 13 to be disengaged from ratchet member 15.

(Return Cam Surface 22c)

Return cam surface 22c is provided between releasing surface 22b and blocking surface 22a such that the diameter increases from releasing surface 22b to blocking surface 22a. That is, the distance between the rotational center (support shaft 23) of ratchet restraint 22 and return cam surface 22c gradually increases from the connection with releasing surface 22b toward the connection with blocking surface 22a. When base lever 19 is moved to the non-restricted position where base lever 19 faces releasing surface 22b, base lever 19 is gradually pushed in the latch engaging direction by outer wall 19e abutting against return cam surface 22c, and returns to the restricted position. The position where releasing surface 22b faces outer wall 19e is the abutting position of ratchet restraint 22.

Support shaft 23 of ratchet restraint 22 is preferably arranged on an extension line of the trajectory line along which connecting shaft 15b is moved by release component force F2. This allows connecting shaft 15b to move toward support shaft 23, and also allows the point where outer wall 19e abuts against blocking surface 22a, connecting shaft 15b and support shaft 23 to be substantially arranged on a straight line. Therefore, release component force F2 can be efficiently absorbed, and ratchet restraint 22 and ratchet member 15 can be compactly arranged.

(Powered Release Means 24)

Ratchet restraint 22 is moved by the electrically powered release operation force of powered release means 24 that is provided on the rear side of latch body 11.

Figure 2:
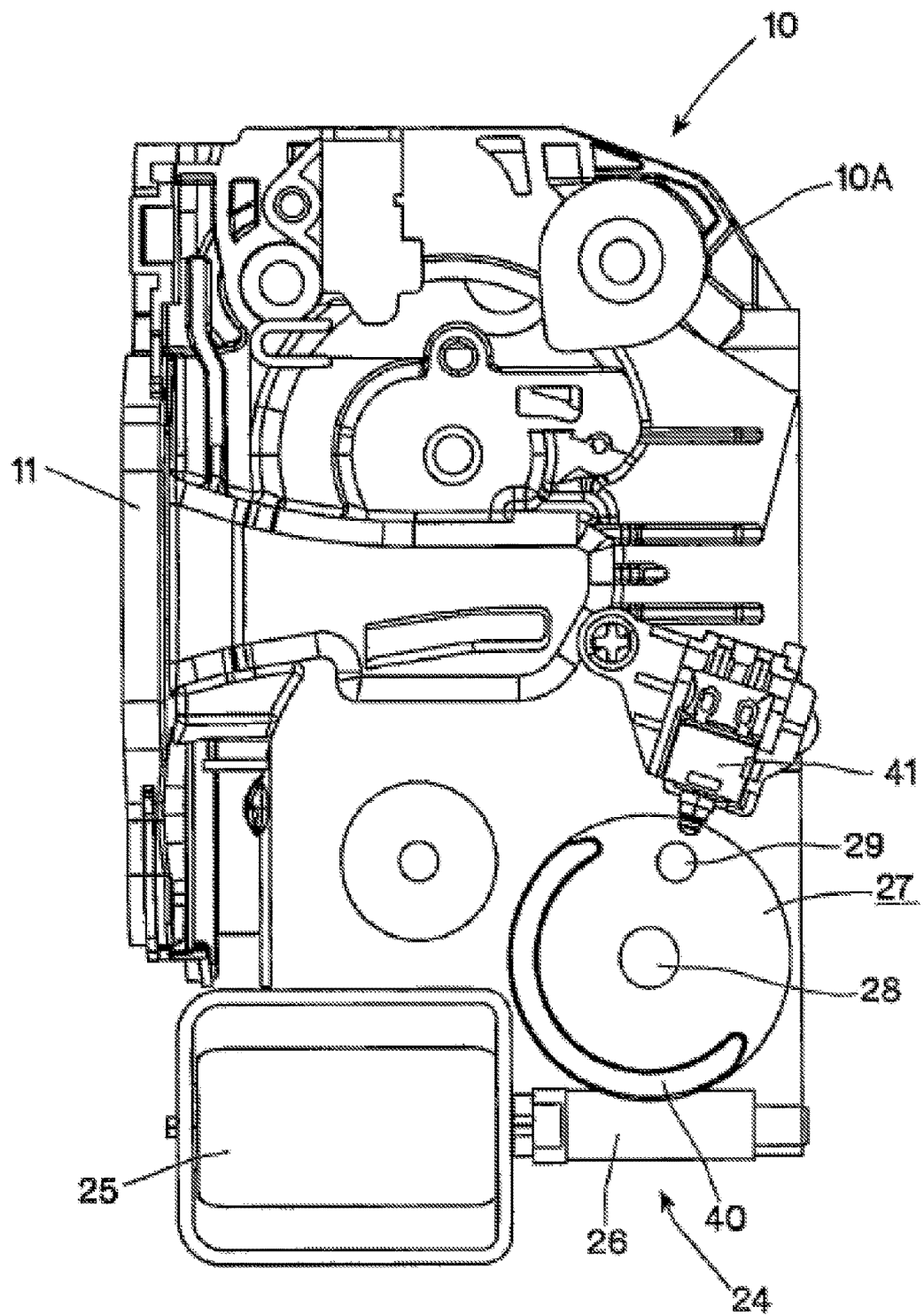
FIG. 2 is a rear view of the vehicle door latch apparatus of the latch unit.

As shown in FIG. 2, the output shaft of motor 25 of powered release means 24 is provided with cylindrical worm 26, which engages outer circumferential gear 27a of worm wheel 27. Wheel shaft 28 of worm wheel 27 is arranged coaxially with support shaft 23. Wheel shaft 28 can be shared with support shaft 23, but in the present embodiment, wheel shaft 28 is a long hollow shaft that protrudes on the front side of latch body 11, and support shaft 23 is inserted into the hollow portion.

Worm wheel 27 and ratchet restraint 22 are coupled to each other by connecting pin 29 so that they rotate together. Thus, when powered release means 24 is activated, the power of motor 25 rotates worm wheel 27, which in turn rotates ratchet restraint 22 through connecting pin 29 in the counterclockwise direction in FIG. 1 and in FIGS. 4A to 4D.

(Opening Operation)

FIGS. 4A to 4D sequentially show the operation of ratchet member 15 and latch 13 that occurs due to the rotation of ratchet restraint 22. Ratchet restraint 22 takes about 850 milliseconds to rotate 360 degrees, while latch 13 returns from the full-latched position to the unlatched position in a short time of about 50 milliseconds due to the latch return force. For this reason, the movement of each part over time is shown in an exaggerated manner in FIGS. 4A to 4D.

FIG. 4A shows the full-latched state. When ratchet restraint 22 is rotated counterclockwise by the activation of powered release means 24, outer wall 19e of base lever 19 is disengaged from blocking surface 22a so as to face releasing surface 22b, and base lever 19 is released from the blocking of ratchet restraint 22, as shown in FIG. 4B. When the blocking is released, base lever 19 is rotated counterclockwise by release component force F2 acting on connecting shaft 15b (see FIGS. 1 and 11), while pawl lever 20 is biased clockwise by the elastic force of ratchet spring 17. Therefore, ratchet member 15 is bent at the central portion, and pawl portion 15a is ejected from full-latch engaging portion 13d in the latch releasing direction. Then, latch 13 is rotated in the releasing direction, and the door is opened (see FIG. 4C).

The counterclockwise rotation of ratchet restraint 22 by powered release means 24 continues after latch 13 is released, and return cam surface 22c of ratchet restraint 22 abuts against outer wall 19e of base lever 19. Then, return cam surface 22c gradually pushes base lever 19 in the latch engaging direction (see FIG. 4C) to cause base lever 19 to return to the restricted position. Thereafter, base lever 19 is held at the restricted position by blocking surface 22a of ratchet restraint 22, as shown in FIG. 4D.

(360 Degrees Rotation Control)

Figure 13:
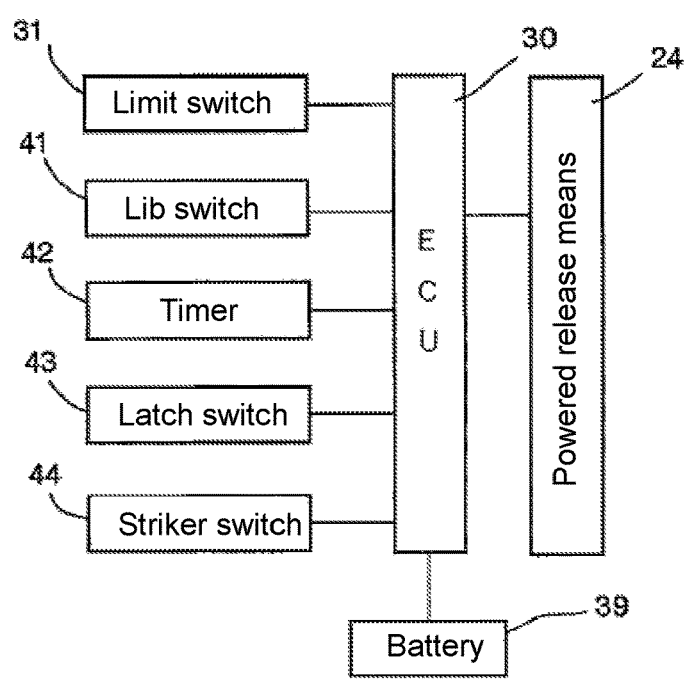
FIG. 13 is a control block circuit diagram of the powered release means.

Powered release means 24 stops operation when ratchet restraint 22 rotates 360 degrees to returns to the initial position, as shown in FIG. 4D. Preferably, ECU 30 of powered release means 24 (FIG. 13) detects the rotational position of ratchet restraint 22 by limit switch 31 and controls the rotation of motor 25. Ratchet restraint 22 can also be returned to the initial position by controlling the operation time of powered release means 24 by means of a timer.

(Returning Ratchet Restraint 22)

Ratchet restraint 22 can also be configured to return to the blocked position by reversing the rotation of motor 25 after ratchet restraint 22 is moved from the blocked position to the release position. In this case, releasing surface 22b is shaped to work as return cam surface 22c.

(Half-Latched State)

Referring again to FIGS. 3A to 3E, the operation of ratchet member 15 during the door closing operation will be further described. As is apparent from the figures, during the door closing operation, ratchet restraint 22 is kept at the blocked position, and base lever 19 of ratchet member 15 continues to be held at the restricted position. As shown in FIG. 3A, when latch 13 is rotated in the door closing direction, pawl lever 20 that is in contact with outer circumference 13a of latch 13 is pushed in the latch releasing direction first due to gap 21 that is formed between base lever 19 and pawl lever 20. Then, when latch 13 comes to the half-latched position, pawl lever 20 can be moved in the latch engaging direction by the elastic force of ratchet spring 17. Therefore, when the closing force of the vehicle door is weak and latch 13 cannot rotate beyond the full-latched position after rotating beyond the half-latched position, pawl portion 15a of pawl lever 20 engages half-latch engaging portion 13c to hold latch apparatus 10 at the half-latched state in the same manner as a conventional door latch apparatus, as shown in FIG. 12.

(Maintaining the Half-Latched State)

Figure 12:
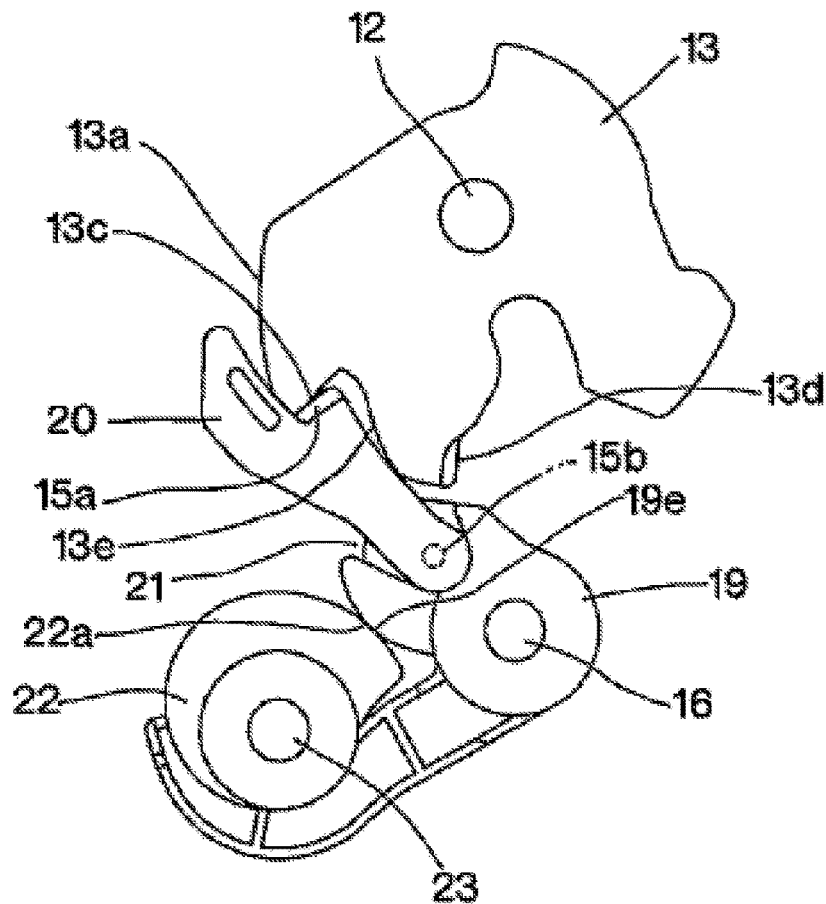
FIG. 12 is a front view showing the half-latched state.

The relationship between ratchet restraint 22 and ratchet member 15 in the half-latched state shown in FIG. 12 is the same as that in the full-latched state shown in FIG. 3D. Therefore, in the half-latched state, release component force F2 acting on connecting shaft 15b of ratchet member 15 is also supported by ratchet restraint 22. Half-latch engaging portion 13c remains engaged with pawl portion 15a so as to prevent latch 13 from rotating in the releasing direction, and any unexpected opening of the vehicle door can be avoided.

(Releasing the Half-Latched State)

In the half-latched state shown in FIG. 12, due to gap 21, pawl lever 20 can be moved about connecting shaft 15b in the latch releasing direction independent of base lever 19 that is at the restricted position. Therefore, pawl portion 15a can be disengaged from half-latch engaging portion 13c by rotating latch 13 toward the full-latched position.

Specifically, for example, when latch 13 is rotated toward the full-latched position by pushing the door in the door closing direction, tilted connecting surface 13e that is formed between half-latch engaging portion 13c and full-latch engaging portion 13d abuts against pawl lever 20. Then, pawl lever 20 is pressed by tilted connecting surface 13e and is moved in the latch releasing direction alone without rotating base lever 19. Therefore, by pushing the door strongly in the door closing direction in order to rotate latch 13 to the full-latched position in the same manner as a conventional apparatus, pawl portion 15a can be disengaged from half-latch engaging portion 13c and can be engaged with full-latch engaging portion 13d.

Thus, in the configuration in which ratchet member 15 is prevented from moving in the latch releasing direction by ratchet restraint 22, it is possible in the present embodiment to disengage ratchet member 15 from half-latch engaging portion 13c without rotating ratchet restraint 22. Therefore, it is possible to arrange both half-latch engaging portion 13c and full-latch engaging portion 13d on the outer periphery of latch 13.

(Effects of Rotary Ratchet Restraint 22)

Since rotary ratchet restraint 22 returns to the initial position after rotating 360 degrees, no spring is needed to return ratchet restraint 22 to the initial position. Because no spring is used, ratchet restraint 22 can be rotated by powered release means 24 with reduced resistance.

Furthermore, since ratchet restraint 22 only rotates in one direction to return to the initial position, no control circuit is required to reverse the output of powered release means 24. In addition, the construction of ratchet restraint 22 and powered release means 24 can be simplified.

(External Force P1, P2)

The latch return force of latch 13 is transmitted as external force P1 from the contact point between full-latch engaging portion 13d and pawl portion 15a to connecting shaft 15b, and is transmitted as external force P2 from connecting shaft 15b to ratchet shaft 16. External forces P1 and P2 are decomposed into main component force F1 and release component force F2. Release component force F2 occurs because ratchet shaft 16 is positioned on the opposite side of ratchet restraint 22 with respect to the line passing through the center of pawl portion 15a and the center of connecting shaft 15b when pawl portion 15a engages latch 13.

(Manual Release Means 32)

Figure 14:
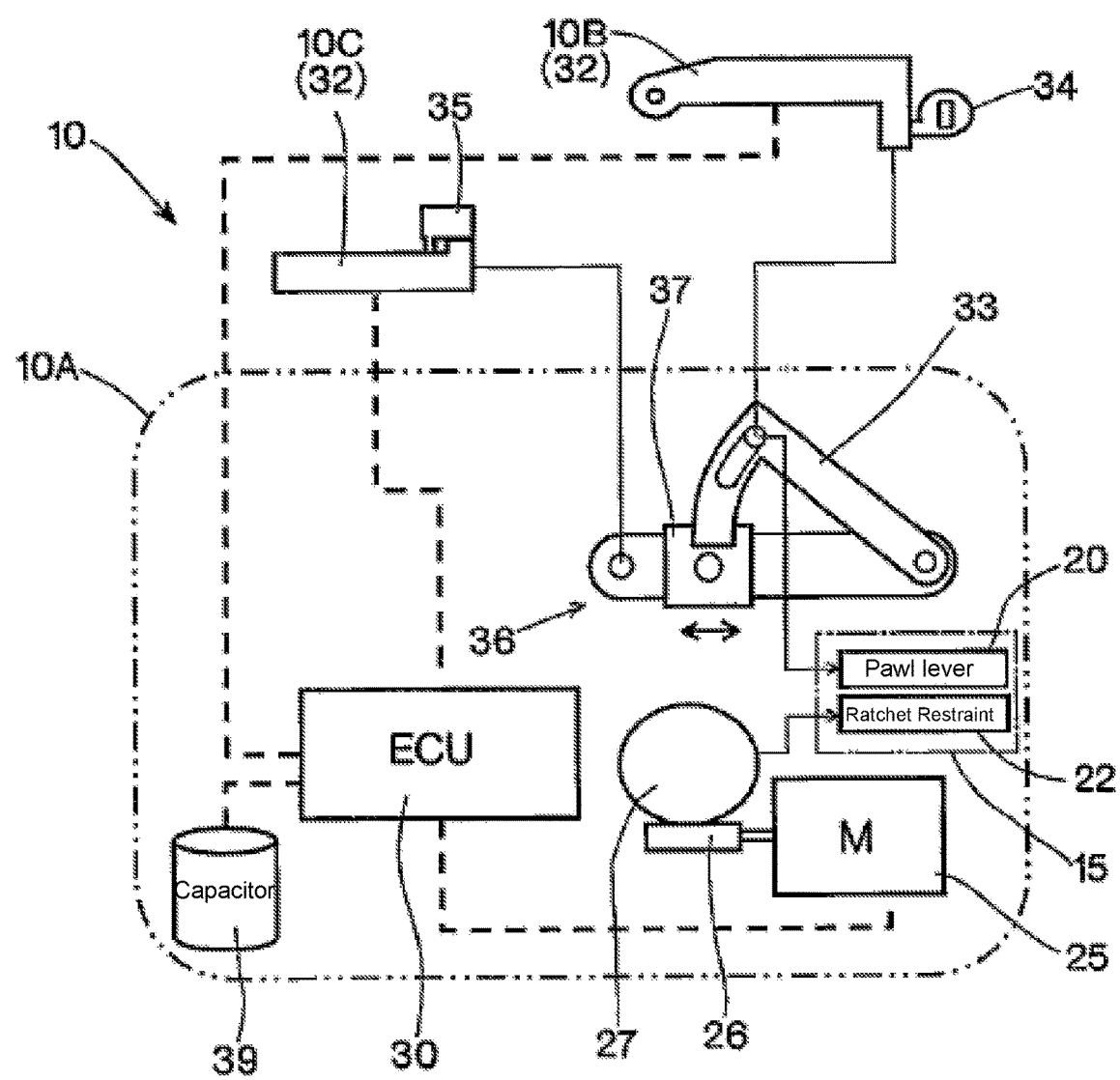
FIG. 14 is a schematic view showing the relationship between the manual release means and the latch unit.

Manual release means 32 disengages ratchet member 15 from latch 13 with manual operation force. Manual release means 32 of the present embodiment has outer door opening handle 10B and inner door opening handle 10C, as shown in FIG. 14. Outer door opening handle 10B and inner door opening handle 10C are common handles that operate with push-and-pull operation. Outer door opening handle 10B and inner door opening handle 10C are connected to pawl lever 20 of ratchet member 15.

As shown in FIGS. 11 and 14, the manual release operation force of manual release means 32 is transmitted to pawl lever 20 of ratchet member 15. Specifically, ratchet pin 20c is provided at the end of pawl lever 20, and the manual release operation force is transmitted to ratchet pin 20c through opening lever 33 or the like. Pawl lever 20 that is subjected to the manual release operation force is rotated in the latch releasing direction about connecting shaft 15b. Due to gap 21, pawl lever 20 can be rotated in the latch releasing direction independent of base lever 19. Therefore, even when a failure occurs in powered release means 24, the door can be opened by the manual release operation force of manual release means 32.

Thus, in the present embodiment, the releasing operation is conducted either by moving pawl lever 20 by means of manual release means 32 or by moving ratchet restraint 22 by means of powered release means 24, and manual release means 32 and powered release means 24 do not interfere with each other. It is also a characteristic feature of the present embodiment that ratchet restraint 22 is provided completely independent of the manual release means.

(Outer Lock Mechanism 34 and Inner Lock Mechanism 35)

In the present embodiment, outer lock mechanism 34 is provided near outer door opening handle 10B, and inner lock mechanism 35 is provided near inner door opening handle 10C separately, so that the operation of these mechanisms can be disabled or inactivated independently. Outer lock mechanism 34 and inner lock mechanism 35 disable the door opening operation by preventing outer door opening handle 10B and inner door opening handle 10C from moving, respectively. Outer lock mechanism 34 preferably is comprised of a key cylinder that is switched between the blocked position (the locked position) and the unblocked position (the unlocked position) by a security key, such as a dimple key, in order to prevent malicious operation.

Inner lock mechanism 35 is preferably a bar mechanism, which is switched between the blocked position (the locked position) and the unblocked position (the unlocked position) by operating a lock button or the like in the cabin.

Thus, since lock mechanisms 34 and 35 are individually provided near door opening handle 10B and 10C, respectively, latch unit 10A can be simplified. In addition, since door opening handles 10B, 10C and lock mechanisms 34, 35 can be unitized, fabrication and mounting to the door are facilitated.

(Normal Blocking)

In the present embodiment, outer lock mechanism 34 and inner lock mechanism 35 are initially in the blocked state, and normally the door cannot be manually opened by the release operation force of manual release means 32.

In the present embodiment, powered release means 24 conducts the releasing operation by rotating ratchet restraint 22, and manual release means 32 conducts the releasing operation by rotating pawl lever 20. Since ratchet restraint 22 and pawl lever 20 can be moved independently to open the door without interfering with each other, manual release means 32 can always be used in the blocked state. This allows manual release means 32 to have a specialized function as a fail-safe means when powered release means 24 is disabled.

(Unblocked Inner Lock Mechanism 35)

In the present embodiment, since outer lock mechanism 34 and inner lock mechanism 35 are individually provided for outer door opening handle 10B and inner door opening handle 10C, respectively, it is also possible to set inner lock mechanism 35 alone in the unblocked state in order to manually open the door from the cabin.

(Childproof Mechanism 36)

In the present embodiment, inner door opening handle 10C is operatively coupled to opening lever 33 via childproof mechanism 36. Childproof mechanism 36 includes switching portion 37 that is switched between a state where opening lever 33 is locked and a state where opening lever 33 is unlocked, so that inner door opening handle 10C is engaged with and disengaged from opening lever 33 by sliding switching portion 37. By connecting inner door opening handle 10C to opening lever 33 via childproof mechanism 36, it is possible to prevent the door from being opened by a child inadvertently operating inner door opening handle 10C.

(Door Opening Operation Switch 38)

Powered release means 24 is activated by door opening operation switch 38 provided on a door or on a remote controller. Door opening operation switch 38 is preferably an electrostatic sensor, which is attached to outer door opening handle 10B. Door opening operation switch 38 is associated with an authenticator, such as a keyless entry system. Powered release means 24 is also configured to be operated by a switching operation from the cabin.

(Inconsistency in the Operation System)

In the present embodiment, since the door operation is conducted by activating powered release means 24 by means of door opening operation switch 38, even if both or either outer door opening handle 10B or inner door opening handle 10C are in the blocked state, the user does not feel any inconsistency in the operating system.

(Battery 39)

As shown in FIG. 14, latch unit 10A is provided with emergency battery 39. Battery 39 is preferably provided in latch unit 10A of each door. A small and lightweight capacitor is preferably used as battery 39. Battery 39 can activate powered release means 24 even when the supply voltage for the engine is insufficient.

(Measures Against Freezing)

As shown in FIG. 2, rib 40 that extends in an arc shape along about a half circumference is formed on the rear surface of worm wheel 27, and rib switch 41 that is turned on by coming into contact with rib 40 is provided on latch body 11. Rib 40 comes into contact with rib switch 41 when a predetermined time has passed after powered release means 24 is activated. The predetermined time is determined to be sufficient for latch 13 to be disengaged from ratchet member 15 by the operation of powered release means 24 and to return to the unlatched position, and the predetermined time is shorter than the amount of time required for return cam surface 22c of ratchet restraint 22 to abut against base lever 19.

If the return of latch 13 to the unlatched position, while rib switch 41 is on, is not detected, then powered release means 24 halts in order to stop the rotation of ratchet restraint 22 on the assumption that an abnormality has occurred in the rotation of latch 13. An abnormality in the rotation of latch 13 occurs, for example, when the latch return force alone is insufficient to open the door normally because the door sticks to the vehicle body due to freezing, or when the latch return force is insufficient to open the door because the car is in a strongly tilted position.

If ratchet restraint 22 is returned to the blocked position by continuing to operate powered release means 24 when there is an abnormality in the rotation of latch 13, then pawl portion 15a of ratchet member 15 will engage full-latch engaging portion 13d or half-latch engaging portion 13c of latch 13 again, and the door will return to the state where it cannot be mechanically opened. Therefore, when a predetermined condition is satisfied, the rotation of ratchet restraint 22 is stopped before return cam surface 22c of ratchet restraint 22 abuts against base lever 19, so that pawl portion 15a of ratchet member 15 is prevented from engaging full-latch engaging portion 13d or half-latch engaging portion 13c again. If pawl portion 15a can be prevented from engaging full-latch engaging portion 13d or half-latch engaging portion 13c, there is reasonable possibility that the door can be opened, for example, in case of freezing, by means such as pulling the door strongly or melting ice with heat.

The functions of rib 40 and rib switch 41 may be substituted by timer 42. Time sufficient for latch 13 to normally return to the unlatched position after powered release means 24 is activated, and time for judging whether or not an abnormality has occurred in the rotation of latch 13 are set by timer 42, and the control is conducted by ECU 30.

Latch switch 43 that detects the rotational position of latch 13 is preferably used in order to detect the unlatched position of latch 13. Further, since striker 18 is released from striker passage 11a of latch body 11 by the unlatching rotation of latch 13, the unlatched state of latch unit 10A may also be detected by detecting the position of striker 18 relative to striker passage 11a by striker switch 44, (see JP Patent No. 4530912). A signal from an existing courtesy switch that is arranged in the vehicle body may also be used to detect the unlatched state.

(Forced Door Opening)

Base lever 19 of ratchet member 15 is provided with abutting arm 19f that extends toward support shaft 23. Abutting arm 19f is preferably formed integral with resin cover 19b of base lever 19. Abutting surface 19g is formed at the end of abutting arm 19f. Abutting surface 19g is parallel to the line that is radially drawn from the axis of ratchet shaft 16.

When worm wheel 27 is rotated by powered release means 24, abutting surface 19g contacts connecting pin 29 in order to force base lever 19 to rotate in the latch releasing direction. This functions as a fail-safe mechanism. Under certain abnormal situations, there is a possibility that, since sufficient release component force F2 is not applied to ratchet member 15, ratchet member 15 will not be moved in the latch releasing direction even after the blocking by ratchet restraint 22 has been released. In such a case, connecting pin 29 forces base lever 19 to rotate in the latch releasing direction so that the door can be opened.

While several preferred present embodiments of the present invention have been shown and described in detail, it should be understood that various changes and modifications can be made without departing from the spirit or scope of the appended claims.

What is claimed is:

1. A vehicle door latch apparatus comprising:
   a latch that can be rotated against latch return force from an unlatched position to an over-rotating position through a full-latched position while the latch engages a strike;
   a ratchet member that is rotatably supported by a ratchet shaft, wherein the ratchet member having a pawl portion that can be moved to a latch engaging position, where the pawl portion can face a full-latch engaging portion of the latch, and to a latch disengaging position, where the pawl portion is disengaged from the full-latch engaging portion, wherein the ratchet can be released from the latch by release component force, the release component force being caused by latch return force that the ratchet receives via the latch;
   a ratchet restraint that can be moved to a blocked position, where the latch restraint prevents the ratchet member from being disengaged from the latch, and a release position, where the latch restraint allows the ratchet member to be disengaged from the latch; and
   a powered release means that moves the ratchet restraint,
   wherein the ratchet member includes a base lever that is rotatably supported by the ratchet shaft and a pawl lever that is rotatably supported by the base lever via a connecting shaft and that has the pawl portion,
   wherein the base lever is moved from a regulated position to a non-regulated position when the ratchet restraint is moved from the blocked position to the release position, the pawl lever is disengaged from the latch by the release component force, and the pawl lever can be moved about the connecting shaft in a latch releasing direction independent of the base lever that is at the regulated position, and
   further comprising
   manual release means that is connected to the pawl lever and that can move the pawl lever in the latch releasing direction,
   a lock mechanism that is provided between the pawl lever and the manual release means, wherein the lock mechanism is switched between a locked state where the manual release means is disabled or inactivated and an unlocked state where the manual release means can be activated, wherein the manual release means comprises an outer door opening handle and an inner door opening handle, an outer lock mechanism that is switched between a locked state where the outer door opening handle is disabled or inactivated and an unlocked state where the outer door opening handle can be activated; and an inner lock mechanism that is switched between a locked state where the inner door opening handle is disabled or inactivated and an unlocked state where the inner door opening handle can be activated, and, wherein the outer lock mechanism and the inner lock mechanism remain locked or unlocked after the ratchet restraint is moved from the blocked position to the release position.

2. The vehicle door latch apparatus according to claim 1, wherein the latch is rotatably supported by a latch body of a latch unit via a latch shaft, the outer lock mechanism is disposed near the outer door opening handle, and the inner lock mechanism is disposed near the inner door opening handle.

3. The vehicle door latch apparatus according to claim 1, wherein the lock mechanism is manually switched between a locked state and an unlocked state.

4. The vehicle door latch apparatus according to claim 1, wherein the powered release means has a battery.

5. A vehicle door ratchet apparatus comprising:
a latch that engages a striker of a vehicle and that is biased in a door closing direction;
a ratchet member that can engage the latch;
a rotatable ratchet restraint having an outer surface that abuts against the ratchet member;
powered release means that rotates the ratchet member; and
manual release means that is connected to the ratchet member and that can disengage the ratchet member from the latch by manual operation force, wherein the ratchet member has a base lever that is rotatably supported by a ratchet shaft and a pawl lever that is rotatably supported by the base lever via a connecting shaft, wherein the pawl lever has a pawl portion that the latch engages, wherein when the pawl portion engages the latch, the ratchet shaft is on a side opposite to the ratchet restraint with respect to a line that passes through the pawl portion and the connecting shaft, wherein the outer surface of the ratchet restraint includes a blocking surface and a releasing surface that is connected to the blocking surface, and the releasing surface is closer to a center of rotation of the ratchet restraint than the blocking surface, and, wherein the base lever includes a pair of arm portions that form a bifurcating portion, wherein the bifurcating portion supports the connecting shaft and receives one end of the pawl lever, and a gap is formed between the pawl lever and the pair of arm portions, the gap allowing the pawl lever to rotate relative to the base lever.

6. The vehicle door ratchet apparatus according to claim 5, wherein the outer surface of the ratchet restraint has a return cam surface that is connected to the releasing surface and the blocking surface on both sides of the return cam surface, wherein the blocking surface has an arc-shape, and a distance between the return cam surface and a rotational center of the ratchet restraint gradually increases from a connection between the return cam surface and the releasing surface toward a connection between the return cam surface and the blocking surface.

* * * * *